US005184026A

United States Patent [19]

O Breartuin

[11] Patent Number: 5,184,026

[45] Date of Patent: Feb. 2, 1993

[54] ISOLATION CIRCUIT FOR DETECTING THE STATE OF A LINE CONNECTED SWITCH

[75] Inventor: Ciaran S. O Breartuin, Clayton, Mo.

[73] Assignee: Emerson Electric Co., St. Louis, Mo.

[21] Appl. No.: 630,014

[22] Filed: Dec. 19, 1990

[51] Int. Cl.[5] ............ H02J 13/00

[52] U.S. Cl. ............ 307/139; 340/687

[58] Field of Search ............ 363/39, 44, 45, 46, 363/126, 62; 340/652, 657, 658, 686, 687; 307/139

[56] References Cited

U.S. PATENT DOCUMENTS 3,001,120 9/1961 Bereskin ............ 363/126
4,559,594 12/1985 Sears et al. ............ 363/126
4,591,728 5/1986 Krüger ............ 363/126
4,654,774 3/1987 Lemmers ............ 363/48

*Primary Examiner*—William H. Beha, Jr.
*Attorney, Agent, or Firm*—Polster, Lieder, Woodruff & Lucchesi

[57] ABSTRACT

The circuit includes a capacitor (C1) and a resistor (R1) connected in series and interconnected with the switch to sense which phase of the line to which the switch's wiper is connected. The impedance of the series circuit of C1 and R1 is very high, so that when the switch is open, it appears that the wiper is connected with line B, through moderate impedance Z1. (Z1 could be an auxiliary appliance component, e.g. water valve heater relay, or could be simply a resistor). Of course, when the switch is closed, the wiper is connected directly to line A. The monitoring device is referenced to a voltage which is related to the power line by being a dc drop below the instantaneously higher voltage line. The monitoring device thus requires dc isolation from the switch, as well as an input voltage which is substantially less than the line voltage of the power line. DC isolation is provided by C1, while diodes D1 and D2 clamp the signal to acceptable levels. In fact, in many instances diodes D1 and D2 already exist in the monitoring device itself, obviating the need for these extra components. The clamping action causes a quasi-rectangular wave to be generated at the monitoring device's input. This wave is phase-shifted by 180 degrees when the switch changes state. This is how the switch's state is determined. Capacitor C2, which is optional, can be used to smooth out transients caused by line spikes and other disturbances.

7 Claims, 2 Drawing Sheets

ISOLATION CIRCUIT FOR DETECTING THE STATE OF A LINE CONNECTED SWITCH

BACKGROUND OF THE INVENTION

This invention relates to electrical circuits for detecting the status of a switch and more particularly, to an isolating circuit for use in a microprocessor based control system for detecting the state of a switch connected to a power line.

Microprocessors are being increasingly used in control units for household appliances. As such, they are replacing mechanical logic elements and their associated wiring which, up till now, carried out necessary control functions in the appliance. In a washing machine, for example, the control of the machine cycle is based upon a logical sequence of events whose completion must be sensed in order for the machine to perform its job. The circuitry involved typically includes at least one water level switch, since only when the water reaches a predetermined volume (a minimum value) should the water heating elements be activated. Consequently, the water heating elements include a relay which is series connected with the water level sensor. Similarly, the motor turning the washing machine tub should not turn on unless the door or lid for the tub is closed. Thus the power switch for the motor is series connected with a switch or relay which is activated upon the door or lid being closed.

Introduction of microprocessor control schemes has obviated the need for much of the complex wiring and mechanical elements previously required to make the appliance function properly. Rather than, for example, the timer motors and mechanical switches previously used, a microprocessor chip is programmed to make the various operating decisions required during the machine's work cycle. To do this, however, the microprocessor still must receive as inputs information representing the current status of certain machine components. In the washing machine example noted above, line connected switches are now used. These are switches designed for operation at line voltage (i.e. 110 Vac, 230 Vac in Europe) connected in series with other components for safety reasons. The problem with using these switches is first, detecting the operating status of the switch, which is subject to a high voltage level, and providing a status indication to the microprocessor which operates at a much lower voltage level. Subjecting the microprocessor to any voltage approximating line voltage would destroy the microprocessor. Second, the switch status sensing must conform to the topology of the appliance; i.e. it must not interfere with the operation of other machine circuits.

SUMMARY OF THE INVENTION

Among the several objects of the present invention may be noted the provision of a circuit for use in detecting the status of a switch operating at line voltage; the provision such a circuit to isolate the switch from a microprocessor responsive to the switch status to perform certain functions; the provision of such a circuit to be useful in a household appliance such as a washing machine or the like; the provision of such a circuit to be compatible with the control topology of the appliance; and, the provision of such a circuit which is inexpensive and easily implemented.

The invention, briefly stated, is for a circuit for monitoring the operational status of a switch connected to an AC power line. The circuit provides an indication of the switch status to a control device which requires an input voltage substantially less than line voltage of the power line. The circuit senses positive and negative transitions in the AC power line voltage without allowing any flow of DC current. It also converts each sensed pair of transitions to a rectangular-wave pulse which is provided to the device and which has a maximum voltage level compatible with the input voltage requirements of the device. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENT

Figure 2:
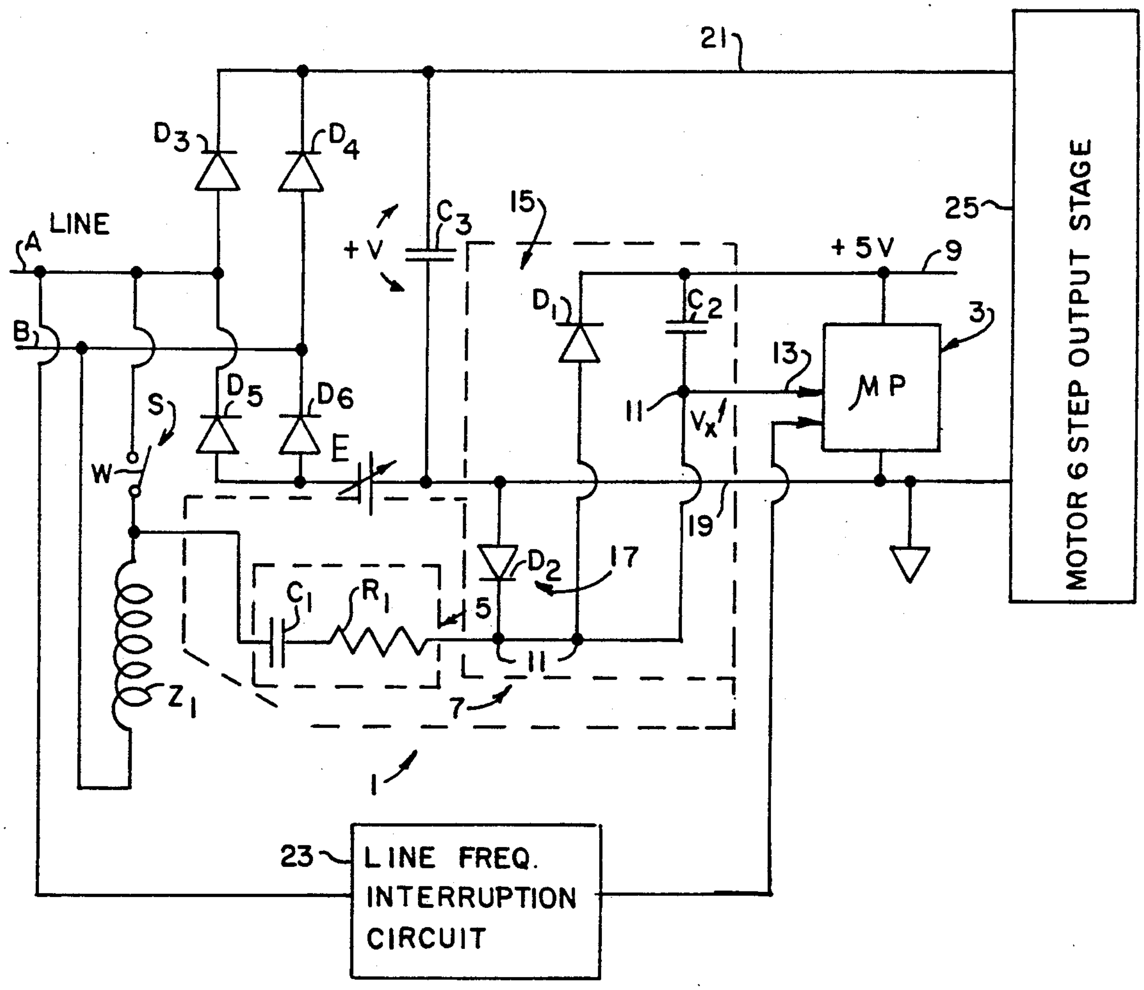
FIG. 2 is an electrical schematic of the circuit in a practical application in a household appliance; and, FIGS. 3*a*–3*d* are representations of waveforms illustrating operation of the circuit.

Referring to the drawings, a circuit for monitoring the operational status of a switch S is indicated generally 1. As shown in FIG. 2, the switch is connected to an AC power line A and has a switch arm W which opens and closes the switch. The switch is used, for example, in a household appliance such as a washing machine and when closed, causes some function which is part of the machine operating cycle to be initiated. The status of switch S is monitored by a control device such as a microprocessor 3. It will be understood that while switch S is subject to the AC power line voltage, which is, for example, 110 (or 230) volts AC (see FIG. 3*a*), the input voltage to which the microprocessor is subjected is on the order of 5 volts DC. This is substantially less than the AC line voltage. If the voltage across the switch were transmitted to the microprocessor, the microprocessor would be severely damaged or destroyed.

Figure 1:
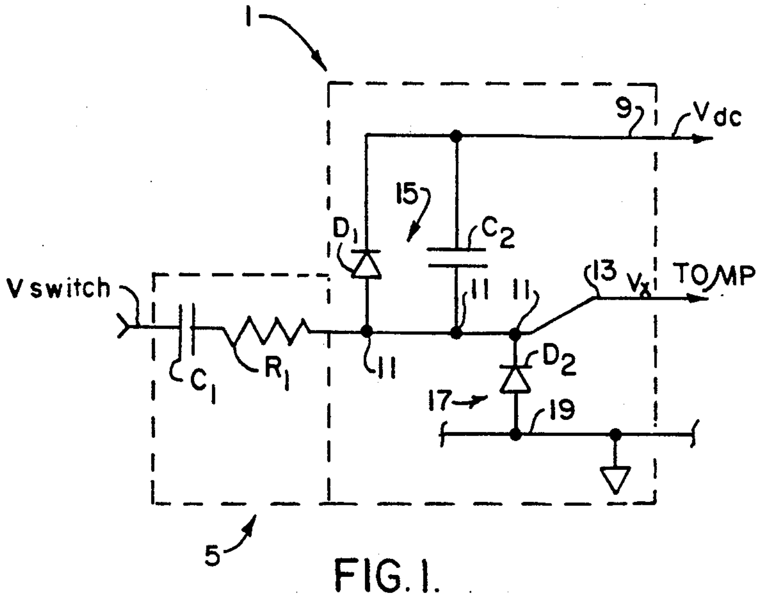
FIG. 1 is an electrical schematic of an isolating circuit of the present invention.
Figure 3A:
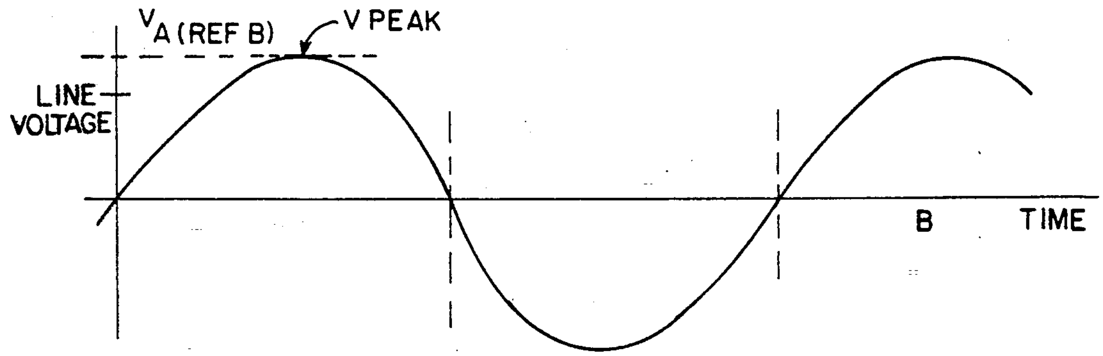
Figure 3B:
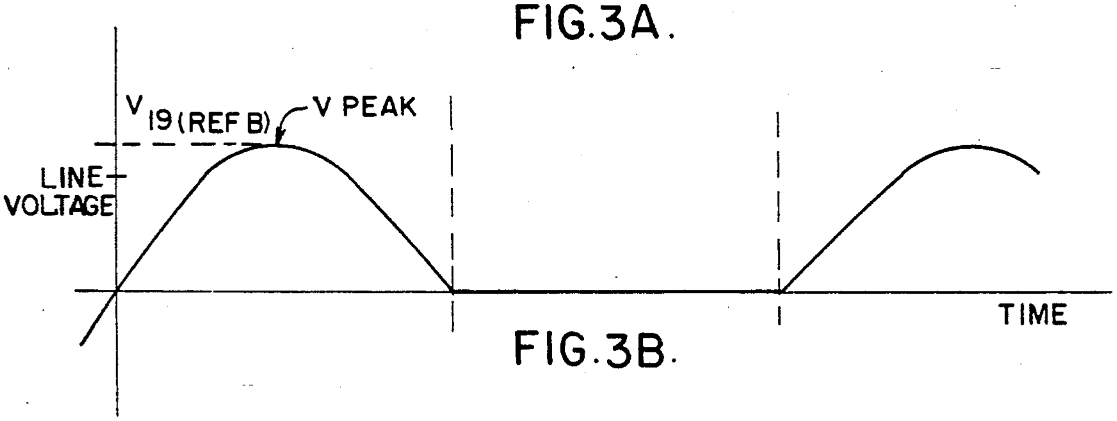
Figure 3C:
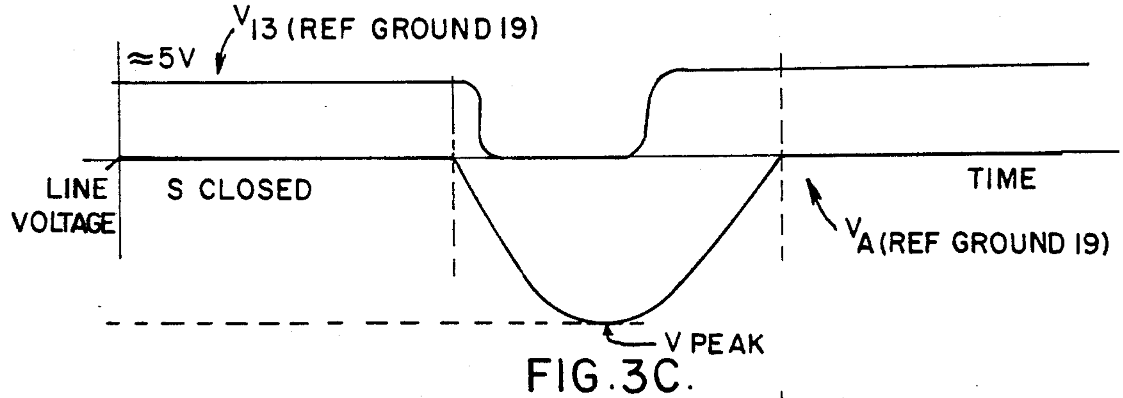
Figure 3D:
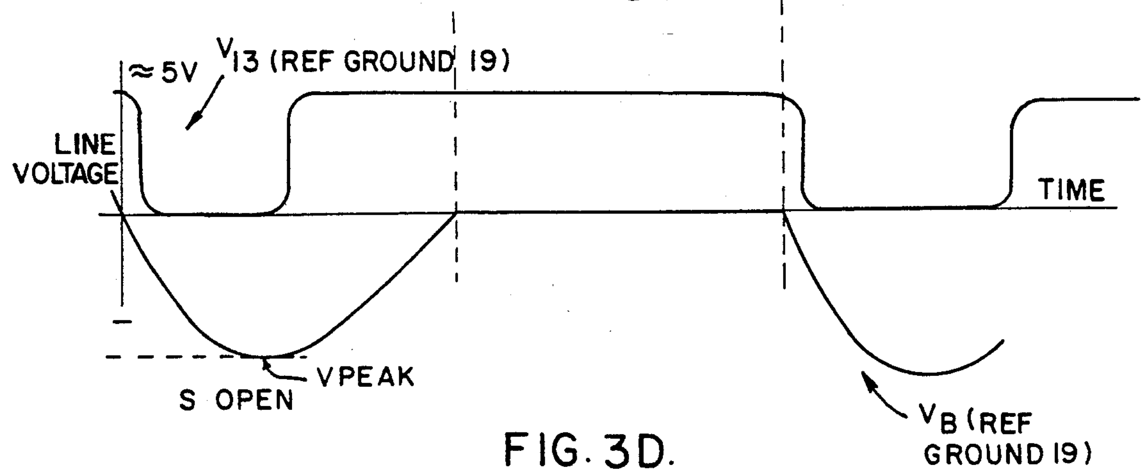

As shown in FIG. 1, circuit 1 includes a means 5 for sensing positive and negative transitions in the AC power line voltage; and, a means 7 in FIG. 2 for converting each sensed pair of transitions to a rectangular-wave pulse (see FIGS. 3*c* and 3*d*). This pulse is provided to the microprocessor and has a maximum voltage level compatible with the input voltage requirements of the microprocessor. The sensing means 5 includes a capacitor C1 and a resistor R1 connected in series. The capacitor serves to isolate the DC control portion of the appliance from the AC power side thereof.

Converting means 7 includes a second capacitor C2 which acts as a filter to eliminate noise spikes. One side of this capacitor is connected to a DC voltage power supply line 9 for the microprocessor. The other side of the capacitor is connected to a junction or common point 11 to which the output of sensing means 5 is also connected. An output line 13 of circuit 1 extends from junction 11 to an input of the microprocessor. The converting means further includes first and second voltage clamping means 15 and 17. Each means is comprised by a diode, D1 and D2 respectively. Diode D1 is connected in parallel with capacitor C2. Diode D2 is connected between sensing means 5 (i.e. junction 11) and an electrical ground line 19. The output of the circuit approximates a rectangular wave.

Operation of circuit 1 is illustrated with reference to FIG. 2. As noted, the voltage between lines A–B is AC line voltage. The voltage on these lines is referenced to a line 19 (see FIG. 3*c* and FIG. 3*d*). This waveform arises because of the voltage drop across a diode D3 which is interposed between line A and line 21, and because of the similar voltage drop across a diode D4 which is interposed between line B and the reference line. Another diode D5 is connected between line A and ground line 19, as is a diode D6 between line B and line 21. A DC bus capacitor C3 is connected between reference line 21 and ground line 19 and has a fixed voltage +V across it. This voltage is controlled by variable source E ($V=|V_{A,B}|-E$). Variable source E may also be located in the line 21 and arranged with proper polarity to accomplish the desired result. Consequently, the voltage between either line A or line B and ground will vary between +V and $+V-V_{Apeak}$; or, +V and $+V-V_{Bpeak}$. The respective voltage peaks occur 180 degrees out-of-phase and each has both a DC component and a superimposed AC line voltage component as is best shown in FIGS. 3A through 3C.

A line frequency signal is provided to microprocessor 3 by an interruption circuit 23. This signal indicates to the microprocessor the current portion of the power line cycle. This enables the microprocessor, with the rectangular-wave output signal provided by circuit 1 on line 13, to detect positive and negative transitions of the AC component on lines A and B. This, in turn, informs the microprocessor of the status of a switch S. The microprocessor then can use its internally programmed logic to carry out the next step in the machine cycle.

If, for example, switch S is closed, the input voltage to circuit 1 is the line A voltage. As the voltage level between line A and ground rises and falls, capacitor C1 is negatively charged to the peak input AC line voltage and then positively charged to, approximately, −5v.DC, if the voltage on C3 is zero. Any DC voltage across capacitor C3 is reflected as a positive voltage on capacitor C1. Capacitor C2, which is, for example, a 0.001uF capacitor, acts as a filter to eliminate noise spikes. In a washing machine of the type in which circuit 1 is useful, a six-step motor output stage 25, for example, causes relatively sharp noise spikes to occur every time the output switches. In addition, variable source E, which could be a switchmode power supply, could be another significant source of noise. Unless this noise is filtered out, E could show up as a real signal. Resistor R1 and capacitor C1 also act to limit current peaks.

Capacitor C2, besides acting as a filter, also functions as a sample-and-hold element. The large voltage on capacitor C1 is periodically transferred ("dumped") across to capacitor C2, with the excess charge being dissipated by clamping diodes D1 and D2. Capacitor C1 typically has a charge storage capacity 20 times greater than capacitor C2, due mainly to its much higher voltage rating. As a result, capacitor C2 charges up very quickly when the C1 voltage is dumped into it. Conversely, when the voltage on capacitor C1 goes more negative, negative current is pulled through capacitor C2 at a rapid rate. At such time, capacitor C2 charges to a level below common which is equal to the voltage drop (approximately 0.6v) across one of the clamping diodes. The clamping diodes then provide the additional charge required to fully charge capacitor C1.

During one line voltage frequency cycle, circuit 1 produces an output signal on line 13 which has a voltage range, for example, of +5.6v to −0.6v. This corresponds to the input line voltage for microprocessor 3. Since this range of voltages is compatible with the input line requirements for a microprocessor, the status of switch S can thus be detected by the microprocessor while, at the same time, switch S is effectively isolated from a dc point of view from the microprocessor. As shown in FIGS. 3*c* and 3*d*, the signal produced approximates a rectangular-wave and has the same frequency as the AC power line. By comparing the phase of this input with the signal from interrupt circuit 23, the microprocessor can readily determine the state of switch S.

If switch S is open, the resultant output signal on line 13 appears as shown in FIG. 3*d*. Since the input to circuit 1 would now be coupled to the other phase of input line A–B, through, for example, an impedance Z1, the output signal of circuit 1 would be 180 degrees out-of-phase with the signal produced when switch S is closed. Z1 represents, for example, an auxiliary appliance component such as a water valve, heater relay, resistor, etc. Z1 would typically be many orders of magnitude smaller than the input impedance of the circuit 1.

Capacitor C1 blocks ("isolates") any dc from flowing from the switch circuit to the monitoring device (and vice versa) and so does not allow disturbance of the rest of the circuit. (If a dc current were allowed to flow, the overall voltage relationships between the line and the monitoring device would be severely upset—i.e. the rest of the circuit would not work.) Only the varying part of the signal (i.e. the ac from the line) is transferred across C1.

It will be understood that a number of circuits 1 can be employed at the same time to provide status indications to the microprocessor for a number of switches. Further, one of these circuits could serve as circuit 23, a zero crossing reference circuit. Also, the circuit is impervious to slow changes in the DC bus voltage level on C3. Lastly, the circuit is low cost and uses standard value components for the capacitors, resistor and diodes.

Having thus described the invention, what is claimed and desired to be secured by Letters Patent is:

1. Un an apparatus having a switch operatively connected to a power line, the status of the switch being used to determine operational requirements for the apparatus, the apparatus including a microprocessor for determining an operational sequence for said apparatus in response to the status of said switch, the improvement comprising means for monitoring the status of the switch, said monitoring means including means for sensing positive and negative transitions on the power line, said sensing means having an input side electrically operatively connected to the switch and an output side, means for converting the sensed transitions into a rectangular wave form, said converting means having an input side connected to the output side of said sensing means and an output side connected to the microprocessor, said sensing means detecting the status of the switch by sensing a phase shift at the switch as an indication of the switch status.

2. The improvement of claim 1 wherein the sensing means includes a first capacitor connected in series with an impedance, said first capacitor operatively connected to the switch and the impedance being operatively connected to the converting means on a second side.

3. The improvement of claim 3 wherein the converting means including a second capacitor operatively connected to the sensing means for periodically transferring the charge from the first capacitor to the second capacitor.

4. The improvement of claim 3 wherein the converting means further includes a first clamping means and a second clamping means, said first clamping means being electronically connected in parallel with the second capacitor and the second clamping means being electronically connected between the first capacitor and electrical common.

5. The improvement of claim 4 wherein the first and second clamping means comprise diodes.

6. The apparatus of claim 5 wherein the first and second capacitors and the impedance are connected in series, the converting device further including a pair of output lines operatively connected between respective first and second sides of said second capacitor and to said microprocessor.

7. In an apparatus including a switch having a first side connected to a first power line, and a second side, an apparatus component electrically connected between the second side of the switch and to a second power line, the improvement comprising means for monitoring the state of the switch by sensing a phase shift at the switch, said sensing means having an input side operatively connected to a point between the switch and the apparatus component, means for converting the sensed phase shift into a wave form, said converting means having an input side connected to an output side of said sensing means, and an output side connected to a microprocessor, and a microprocessor operatively connected to the output side of said converting means, said microprocessor using the detected switch status to select the operational condition of said apparatus.

* * * * *

UNITED STATES PATENT AND TRADEMARK OFFICE
CERTIFICATE OF CORRECTION

PATENT NO. : 5,184,026

DATED : February 2, 1993

INVENTOR(S) : Ciaran S. O Breartuin

It is certified that error appears in the above-identified patent and that said Letters Patent is hereby corrected as shown below:

Column 4, line 47 is "Un" should be -- In --

Column 5, line 3 is "claim 3" should be -- claim 2 --

Signed and Sealed this

Eleventh Day of January, 1994

*Attest:*

BRUCE LEHMAN

*Attesting Officer*

*Commissioner of Patents and Trademarks*